United States Patent
Otozai

(10) Patent No.: US 9,470,280 B2
(45) Date of Patent: Oct. 18, 2016

(54) IRREVERSIBLE MECHANISM

(75) Inventor: Keitaro Otozai, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 14/424,366

(22) PCT Filed: Aug. 27, 2012

(86) PCT No.: PCT/JP2012/071614
§ 371 (c)(1),
(2), (4) Date: Feb. 26, 2015

(87) PCT Pub. No.: WO2014/033818
PCT Pub. Date: Mar. 6, 2014

(65) Prior Publication Data
US 2015/0260242 A1 Sep. 17, 2015

(51) Int. Cl.
*F16D 51/00* (2006.01)
*F16D 51/12* (2006.01)
*F16D 43/02* (2006.01)
*F16D 65/22* (2006.01)
*F16D 41/10* (2006.01)
*F16D 125/36* (2012.01)
*F16D 125/66* (2012.01)
*F16D 121/14* (2012.01)

(52) U.S. Cl.
CPC ............. *F16D 51/12* (2013.01); *F16D 43/02* (2013.01); *F16D 65/22* (2013.01); *F16D 41/10* (2013.01); *F16D 2121/14* (2013.01); *F16D 2125/36* (2013.01); *F16D 2125/66* (2013.01)

(58) Field of Classification Search
CPC .... F16D 51/12; F16D 65/22; F16D 2121/14; F16D 41/10; F16D 43/02; F16D 43/212536; F16D 2125/66; F16D 2125/14

USPC .............................. 188/343, 72.1, 72.7, 73.1
See application file for complete search history.

(56) References Cited

U.S. PATENT DOCUMENTS

2007/0017755 A1 * 1/2007 Matsueda ............... F16D 51/12
188/72.1

FOREIGN PATENT DOCUMENTS

| JP | 63-115920 A | | 5/1988 |
| JP | 04-261987 A | | 9/1992 |
| JP | 2006-214523 A | | 8/2006 |
| JP | 2006-347412 A | | 12/2006 |
| JP | 2007120535 A | * | 5/2007 |
| JP | 2008-309222 A | | 12/2008 |
| JP | 2009-287605 A | | 12/2009 |
| JP | WO-2015/162791 A1 | * | 10/2015 |

OTHER PUBLICATIONS

English Translation International Search Report PCT/JP2012/071614 dated Nov. 20, 2012.

* cited by examiner

*Primary Examiner* — Pamela Rodriguez
(74) *Attorney, Agent, or Firm* — McDermott Will & Emery LLP

(57) ABSTRACT

An irreversible mechanism is provided with an input shaft that receives input of rotational drive force, an output shaft that receives transmission of torque from the input shaft, a ball ramp part that generates radial force when load torque is applied to the output shaft, a brake lining that receives the radial force from the ball ramp part, a brake drum that the brake lining is pressed against when the brake lining receives the radial force from the ball ramp part, and a housing that accommodates the input shaft, the output shaft, the ball ramp part, the brake lining and the brake drum inside.

2 Claims, 3 Drawing Sheets

IRREVERSIBLE MECHANISM

CROSS-REFERENCE TO RELATED APPLICATIONS

This application is the U.S. National Phase of PCT/JP2012/071614 filed Aug. 27, 2012 the subject matter of which is incorporated herein by reference in entirety.

TECHNICAL FIELD

The present invention relates to power transmission systems for general industrial machinery, aircrafts and so on, more specifically to an irreversible mechanism that should not transmit rotation to an input shaft if load torque were applied to an output shaft.

BACKGROUND ART

Various mechanisms have hitherto been designed containing an input shaft for receiving input of rotational drive force and an output shaft for receiving the transmission of torque from the input shaft to intercept the transmission of load torque from the output shaft to the input shaft by generating brake torque when the load torque is applied to the output shaft.

Conventionally general irreversible mechanism of this kind has the following configuration. That is, as shown in FIG. 3, the general irreversible mechanism a1 has the configuration in which a ball ramp part a4 interposed between an input shaft a2 and an output shaft a3 converts rotational drive force of load torque applied to the output shaft a3 to an axial load, and apply this load to multi-plate brakes a5 in order to generate brake torque (See Patent Document 1, for example).

And, with such configuration, there are the following problems. That is, the problem exists that the overall length in the axial direction of the irreversible mechanism a1 including the multi-plate brakes a5 and its number of components increase because the multi-plate brakes a5 are constructed with many friction plates a6 arranged in a state that they are layered along the axial direction. Furthermore, the problem exists that the overall length of an housing a8 accommodating the input shaft a2, the output shaft a3, the friction plates a6 and so on accordingly increases and disadvantages in weight, costs, etc. of such irreversible mechanism a1 as a whole are also given because the overall length in the axial direction of the irreversible mechanism a1 is large.

RELATED ART DOCUMENTS

Patent Documents

Patent document 1: Japanese Unexamined Patent Application Publication No. 2006-214523.

SUMMARY OF THE INVENTION

Problems to be Solved by the Invention

The present invention has paid attention to the above-described points and has an object to provide an irreversible mechanism having a short overall length, a small number of components and a lightweight.

Means of Solving the Problems

In order to solve the problem, the irreversible mechanism according to the present invention performs control described below. That is, the irreversible mechanism according to the present invention includes an input shaft that receives input of rotational drive force, an output shaft that receives the transmission of torque from the input shaft, a ball ramp part that generates radial force when load torque is applied to the output shaft, a brake lining that receives the radial force from the ball ramp part, a brake drum that the brake lining is pressed against when the brake lining receives the radial force from the ball ramp part, and a housing that accommodates the input shaft, the output shaft, the ball ramp part, the brake lining and the brake drum inside.

With such configuration, the transmission of rotation to the input shaft can be intercepted by pressing the brake lining against the brake drum using the radial force generated by the ball ramp part when load torque is applied to the output shaft. Thus, the overall length of the irreversible mechanism can be shortened and the number of components as well as the weight can also be reduced in comparison with conventional irreversible mechanisms using multi-plate brakes.

Effects of the Invention

According to the present invention, there can be provided an irreversible mechanism having a short overall length, a small number of components and a light weight.

MODE FOR CARRYING OUT THE INVENTION

An embodiment of the present invention will be described below by referring to the attached drawings.

Figure 1:
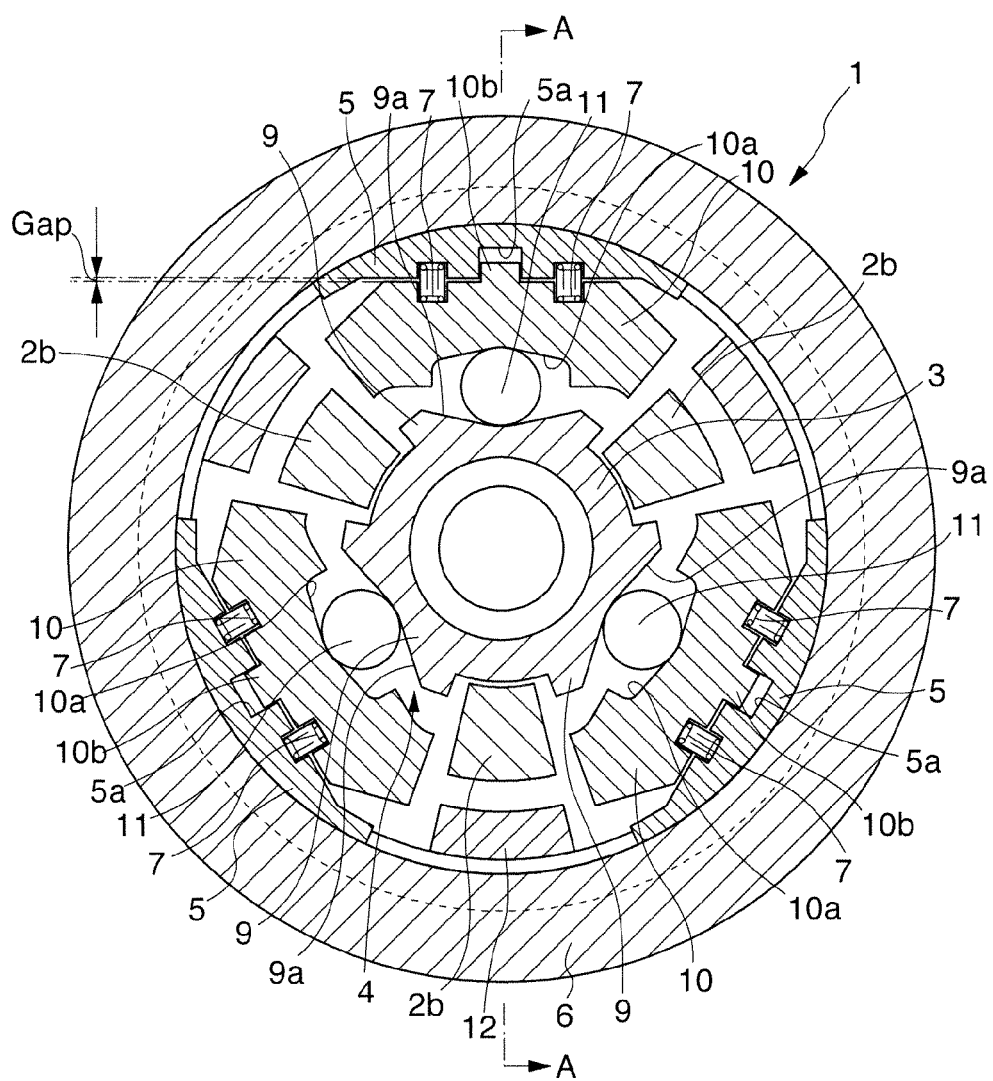
FIG. 1 is a schematic diagram showing an irreversible mechanism according to an embodiment of the present invention.
Figure 2:
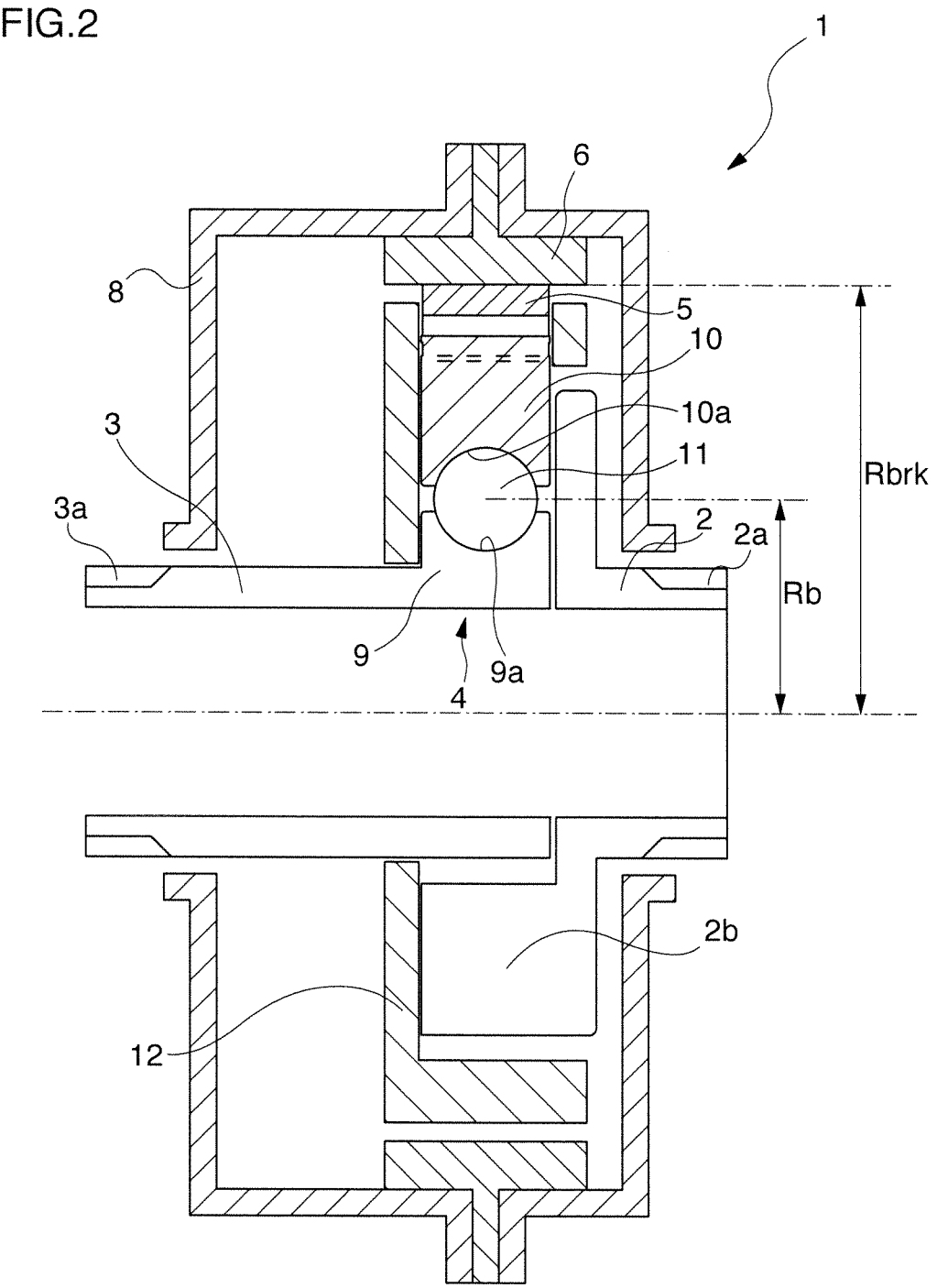
FIG. 2 is a cross-sectional view taken along the line A-A in FIG. 1.
Figure 3:
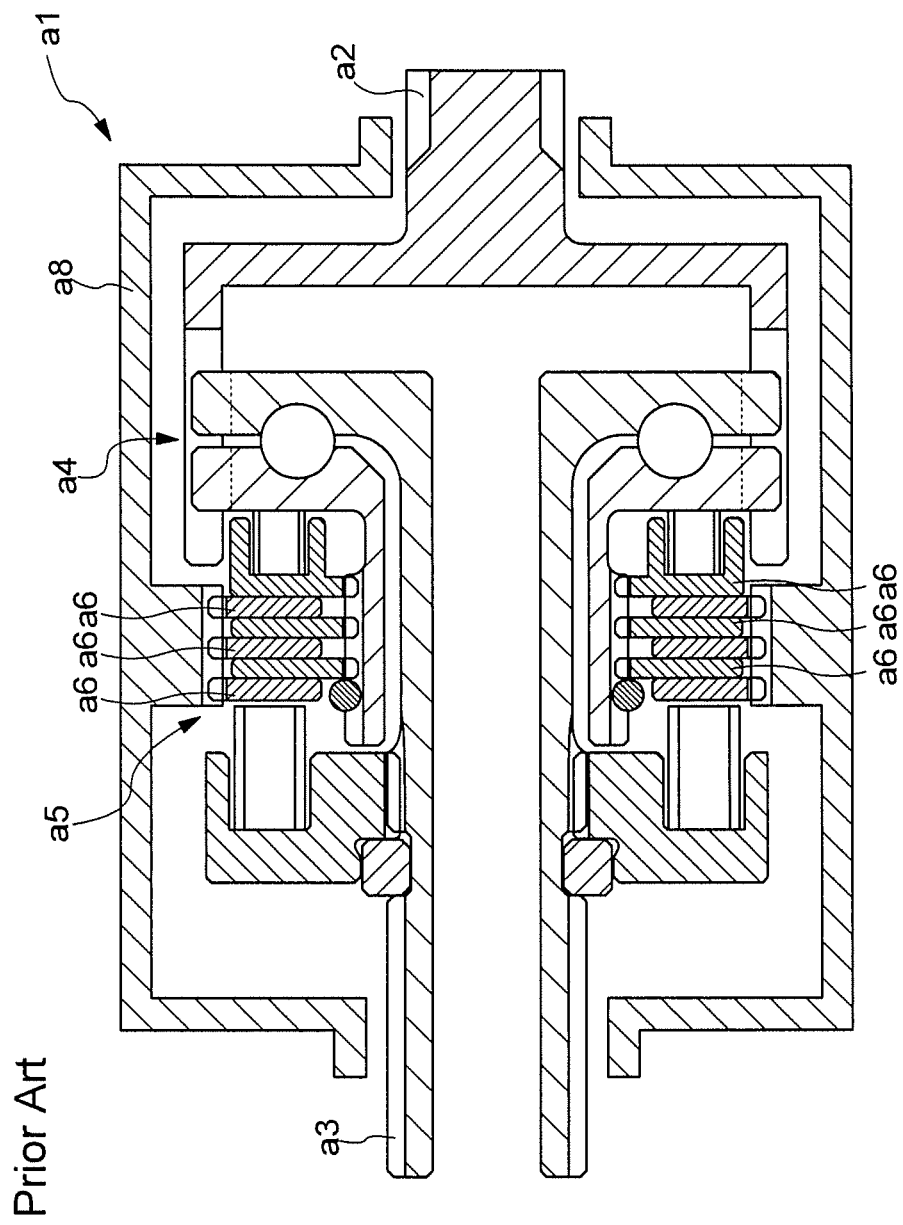
FIG. 3 is a schematic diagram showing a conventional irreversible mechanism.

As shown in FIGS. 1 and 2, an irreversible mechanism 1 according to this embodiment, which is used for a driving mechanism of a flap of an aircraft and so on, includes an input shaft 2 that receives input of rotational drive force, an output shaft 3 that receives the transmission of torque from the input shaft 2, ball ramp parts 4 that generates radial force when load torque is applied to the output shaft 3, brake linings 5 that receive the radial force from the ball ramp parts 4, a brake drum 6 that the brake linings 5 are pressed against when the brake linings 5 receive the radial force from the ball ramp parts 4, and a housing 8 that accommodates the input shaft 3, the output shaft 3, the ball ramp parts 4, the brake linings 5 and the brake drum 6 inside.

As shown in FIG. 2, the input shaft 2 has an input end 2a to be connected to a drive source on one end portion in the axial direction and is integrally provided with keys 2b to engage with the output shaft 3 so as to drive this output shaft 3 on the other end side. As shown in FIG. 1, according to this embodiment, the keys 2b are provided at three positions. Mutually adjacent keys 2b are each separated by 120 degrees in the circumferential direction. And, there are gaps between the keys 2b and first plates 9 that are integrally mounted on the output shaft 3 while the input shaft 2 and the output shaft 3 do not receive rotation torque at all.

As shown in FIG. 2, the output shaft 3 has an output end 3a to be connected to a driven object on one end portion in the axial direction and is integrally provided with the first plates 9 to be components of the ball ramp parts 4 on the other end side. The first plate 9 receives the transmission of rotational drive force from the input shaft 2 by putting the key 2b into contact with an end portion in the circumferential direction of the first plate 9.

As shown in FIGS. 1 and 2, the ball ramp part 4 includes the first plate 9 that is integrally mounted on the output shaft 3 as described above, a second plate 10 that is provided outside the first plate 9, and a ball 11. The first plate 9 has a first ball ramp 9a on the central portion in the circumferential direction, the first ball ramp 9a facing outward along the radial direction. The second plate 10 has a second ball ramp 10a on the central portion in the circumferential direction, the second ball ramp 10a facing inward along the radial direction. The ball 11 is placed between the first ball ramp 9a of the first plate 9 and the second ball ramp 10a of the second plate 10. As shown in FIG. 1, the first plates 9 are provided at three positions according to this embodiment, each key 2b being placed between mutually adjacent first plates 9. On the other hand, the second plates 10 are provided at three positions according to this embodiment, the key 2b of the input shaft 2 being placed between mutually adjacent second plates 10. The ball 11 is usually positioned between the center in the circumferential direction of the first ball ramp 9a of the first plate 9 and the center in the circumferential direction of the second ball ramp 10a of the second plate 10, the first plate 9 and the second plate 10 being most close to each other in the radial direction. And, when the first plate 9 rotates relative to the second plate 10 against rolling resistance of the ball 11 on the first and second ball ramps 9a and 10a, the ball 11 rolls on the first and second ball ramps 9a and 10a, and thereby the second plate 10 is pressed and moved outward in the radial direction, or to be apart from the first plate 9 in the radial direction. Consequently, the second plate 9 transmits the outward radial force to the brake lining 5.

As shown in FIGS. 1 and 2, the brake lining 5 is provided outside the second plate 10. Each brake lining 5 has a positioning recess 5a that is capable of engaging with a positioning projection 10b provided on the outer surface of each second plate 10. According to this embodiment, the brake linings 5 are also provided at three positions. Each compression coil spring 7 as a energizing means to preload the brake lining 5 outward in the radial direction is placed between the brake lining 5 and the second plate 10. Carriers 12 are arranged at both sides of the brake linings 5 in the axial direction so as to prevent the brake linings 5 from falling away. As described above, the brake linings 5 receive the transmission of the outward radial force and are pressed against the brake drum 6 when the second plates 10 of the ball ramp parts 4 are pressed and moved outward in the radial direction.

As shown in FIGS. 1 and 2, the brake drum 6 is formed into an approximately cylindrical shape, and the inner surface thereof is opposed to the outer surface of the brake lining 5. This brake drum 6 is fixed to the housing 8.

The movement and effect of this irreversible mechanism 1 will be described below.

While load torque is applied to the output shaft 3, first, the output shaft 3 and the first plates 9 integrally rotate. In this situation, the first plates 9 rotate relative to the second plates 10 and the second plates 10 are pressed and moved outward in the radial direction when the load torque is larger than the rolling resistance torque of the ball 11 on the first and second ball ramps 9a and 10a and besides friction torque generated with the energizing force of the springs 7 between the brake linings 5 and the brake drum 6 is larger than the rolling resistance torque. Further, as the second plates 10 move outward in the radial direction, the compression coil springs 7 are compressed and the brake linings 5 receives larger energizing force, brake torque increasing. Finally, the second plates 10 are each pressed and brought into close contact with the brake linings 5. In other words, gaps between the plates 10 and the brake linings 5, as Gap shown in FIG. 1, run out. That is, the rotation of the output shaft 3 is stopped after the output shaft 3 is rotated by necessary phase angle S1 to eliminate the gap Gap formed between the plates 10 and the brake linings 5. Since the relative rotation is stopped, this state will be maintained and the load torque will not be transmitted to the input side even if the load torque increases, it is "braking state." The brake torque is in proportion to the load torque, and the relationship between them is summarily represented by the following formula.

$$Tbrk=Tour*m*Rbrk/(Rb*\tan(q))=k*Tout$$

$$(k=m*Rbrk/(Rb*\tan(q)))$$

(Tout: load torque, Tbrk: brake torque)
Rbrk, Rb and q are fixed parameters. So, the relationship (Tout<Tbrk) can be preserved regardless of a value of Tout through regulating the friction coefficient m.
(Rbrk: effective braking radius, Rb: effective ball-ramp radius, s: ball-ramp radius)
(See FIGS. 1 and 2)
It is hereupon necessary that each gap between each input shaft key 2b and each plate 9 be larger than the phase angle, and each gap between each input shaft key 2b and each plate 10 be also larger than the phase angle.

On the other hand, when rotational drive force in the reverse direction to the load torque is applied to the input shaft 2 while the irreversible mechanism 1 is acting as described above, the keys 2b come into contact with the output shaft 3. Further, the output shaft 3 rotates by receiving the transmission of the rotational drive force, and the rotation phase difference of the output shaft 3 relative to the second plates 10 and the brake linings 5 is thereby restored to the state before the irreversible mechanism 1 acts. Consequently, the radial force applied to the brake linings 5 reduces, and the output shaft 3, the second plates 10 and the brake linings 5 integrally rotate. When rotational drive force in the same direction as the load torque is applied to the input shaft 2, the keys 2b come into contact with the second plates 10. Then, the second plates 10 are pressed and driven by the keys 2b as soon as the torque applied to the input shaft 2 reaches the magnitude of the difference between the brake torque and the load torque. In this situation, the plates 10 are pressed by the input shaft keys 2b, and the plates 9 are rotated with the load torque. The output shaft 3, the plates 10 and the brake linings 5 hence rotate while constantly keeping the rotation phase difference S1.

As described above, according to this embodiment, when the load torque is applied to the output shaft 3, the ball ramp parts 4 generate the radial force, the brake linings 5 are pressed against the brake drum 6 using the radial force, and the transmission of the rotation to the input shaft 2 is thereby intercepted. Thus, the overall length of the irreversible mechanism 1 can be shortened and the number of components as well as the weight can also be reduced in comparison with conventional irreversible mechanisms with multi-plate brakes.

The present invention is not limited to the above-described embodiment. Various other changes can be made.

For example, a second plate of a ball ramp part may integrally be provided with a brake lining and an energizing means may intervene between a first plate and the second plate, although the second plate of the ball ramp part is configured separately from the brake lining and the compression coil spring as the energizing means is placed between them according to the above-described embodiment.

It is also possible to set the number of ball ramp parts as well as the number of keys of a input shaft to a arbitrary number except three, although the number of the ball ramp parts and the number of the keys of the input shaft are each three.

And, of course, an irreversible mechanism according to the present invention can be used for general power transmission systems of general industrial machinery, aircrafts and so on, other than the driving mechanism of a flap of an aircraft indicated as an example in the above description of the embodiment.

Various other variations may be made within a scope not departing from the gist of the present invention.

INDUSTRIAL APPLICABILITY

According to the configuration of the present invention, there can be provided an irreversible mechanism having a short overall length, a small number of components and a light weight.

DESCRIPTION OF THE REFERENCE NUMERAL 1 irreversible mechanism
2 input shaft
3 output shaft
4 ball ramp part
5 brake lining
6 brake drum
8 housing

The invention claimed is:

1. An irreversible mechanism comprising:
an input shaft that receives input of rotational drive force;
an output shaft that receives transmission of torque from the input shaft;
a ball ramp part including a first plate on the output shaft, a second plate facing the first plate, and a ball that is placed between a first ball ramp of the first plate and a second ball ramp of the second plate, the ball ramp part generating radial force when load torque is applied to the output shaft and the first plate rotates relative to the second plate;
a brake lining that receives the radial force from the ball ramp part through the second plate;
a brake drum that the brake lining is pressed against when the brake lining receives the radial force from the ball ramp part; and
a housing that accommodates the input shaft, the output shaft, the ball ramp part, the brake lining, the brake drum and an energizing means inside.

2. The irreversible mechanism according to claim 1, wherein the brake lining is provided outside the second plate, the brake lining having a positioning recess being capable of engaging with a positioning projection provided on an outer surface of the second plate.

* * * * *